US007834869B2

(12) United States Patent
Kondo et al.

(10) Patent No.: US 7,834,869 B2

(45) Date of Patent: Nov. 16, 2010

(54) DUAL SCAN DISPLAY PANEL DRIVER

(75) Inventors: Akira Kondo, Fukuoka (JP); Naoya Kimura, Chiba (JP); Haruyo Takayanagi, Tokyo (JP); Tetsuro Hara, Tokyo (JP); Takayuki Shimizu, Tokyo (JP); Hiroyoshi Ichkura, Tokyo (JP)

(73) Assignee: Oki Semiconductor Co., Ltd., Tokyo (JP)

( * ) Notice: Subject to any disclaimer, the term of this patent is extended or adjusted under 35 U.S.C. 154(b) by 894 days.

(21) Appl. No.: 11/180,784

(22) Filed: Jul. 14, 2005

(65) Prior Publication Data

US 2006/0022968 A1 Feb. 2, 2006

(30) Foreign Application Priority Data

Aug. 2, 2004 (JP) ............................ 2004-226107

(51) Int. Cl.
*G06F 3/038* (2006.01)

(52) U.S. Cl. ...................... 345/211; 345/212; 345/213; 345/214; 345/204

(58) Field of Classification Search ........... 345/1.1–3.4, 345/36, 42, 55, 61, 76–86, 204, 211–214
See application file for complete search history.

(56) References Cited

U.S. PATENT DOCUMENTS

| | | | | |
|---|---|---|---|---|
| 6,246,397 | B1 * | 6/2001 | Vossler | 345/204 |
| 6,847,346 | B2 * | 1/2005 | Kumagai et al. | 345/98 |
| 6,924,843 | B1 * | 8/2005 | Yamazaki et al. | 348/423.1 |
| 7,123,252 | B1 * | 10/2006 | Baek | 345/213 |
| 2003/0001830 | A1 * | 1/2003 | Wampler et al. | 345/204 |
| 2003/0142037 | A1 * | 7/2003 | Pinedo et al. | 345/1.1 |
| 2004/0252076 | A1 * | 12/2004 | Kodama | 345/3.1 |

FOREIGN PATENT DOCUMENTS

JP 2001265278 A * 9/2001

* cited by examiner

*Primary Examiner*—Henry N Tran
*Assistant Examiner*—Christopher E Leiby
(74) *Attorney, Agent, or Firm*—Rabin & Berdo, P.C.

(57) ABSTRACT

A display panel driver has two driver circuits that drive separate halves of a display panel. Each driver circuit occupies a separate integrated circuit chip. The driver has a screen saving mode in which each driver circuit displays an independent screen saving image that moves in synchronization with a timing signal. The timing signal is generated in one driver circuit and transmitted by a chip-to-chip interface to the other driver circuit. The two screen saving images are thereby coordinated to create what appears to be a single screen saving display.

11 Claims, 4 Drawing Sheets

DUAL SCAN DISPLAY PANEL DRIVER

BACKGROUND OF THE INVENTION

1. Field of the Invention

The present invention relates to a display panel driver having two large-scale integrated circuits that drive separate halves of a display panel, more particularly to a screen saving function of the display panel driver.

2. Description of the Related Art

Although the flat panel displays used in devices such as mobile telephones have conventionally been liquid crystal displays (LCDs), the technology is now shifting to organic electroluminescence (EL) displays, also known as organic light-emitting diode (OLED) displays. Organic EL displays have the advantages of high visibility and good color rendition, and can be made in large sizes. While a small organic EL display can be driven by a large-scale integrated (LSI) circuit disposed on a single semiconductor chip, for larger organic EL displays a dual scan system is used in which the display screen is divided vertically or horizontally into two halves, each driven by an LSI driver circuit on a separate chip.

A disadvantage of organic EL displays is that their display function degrades if the same image is displayed continuously. To prevent degradation, in the standby mode, the displayed image is scrolled so that it does not become 'burned into' the screen. The same type of screen saving function is used to protect the cathode ray tube (CRT) displays of personal computers, generally by having software continuously update the image data during standby. For devices such mobile telephones that must conserve battery power, the screen saving function is preferably implemented in the LSI driver circuits, which can operate while software execution is halted.

When the dual scan system is used, however, if the screen saving function is implemented by the two separate LSI driver circuits, two independent screen saving images are displayed simultaneously in the two halves of the screen, giving the impression that the display is not operating properly.

SUMMARY OF THE INVENTION

An object of the present invention is to enable two driver circuits to create a coordinated screen saving image on a display panel of the dual scan type.

Each of the two driver circuits in the present invention has means for creating a screen saving image that moves in synchronization with a timing signal. In one embodiment of the invention, the means comprises a driving unit that reads image data for half of the screen from a memory unit, displays the image as-is in the normal mode, and shifts the image in synchronization with the timing signal in the screen saving mode. In another embodiment, the means comprises a screen saving unit that generates a traveling image displayable in an arbitrary region and moves this region to different locations on the whole screen in synchronization with the timing signal, and a data reading unit that reads image data for half of the screen from a memory unit, replacing data located in the moving region with the traveling image data.

One of the two driver circuits has a chip-to-chip interface for sending the timing signal to the other driver circuit, and the other driver circuit has a chip-to-chip interface circuit for receiving the timing signal. Both driver circuits therefore operate according to the same timing signal, so that in the screen saving mode, they create a screen saving image that moves in a coordinated manner on the display panel as a whole.

DETAILED DESCRIPTION OF THE INVENTION

Figure 1:
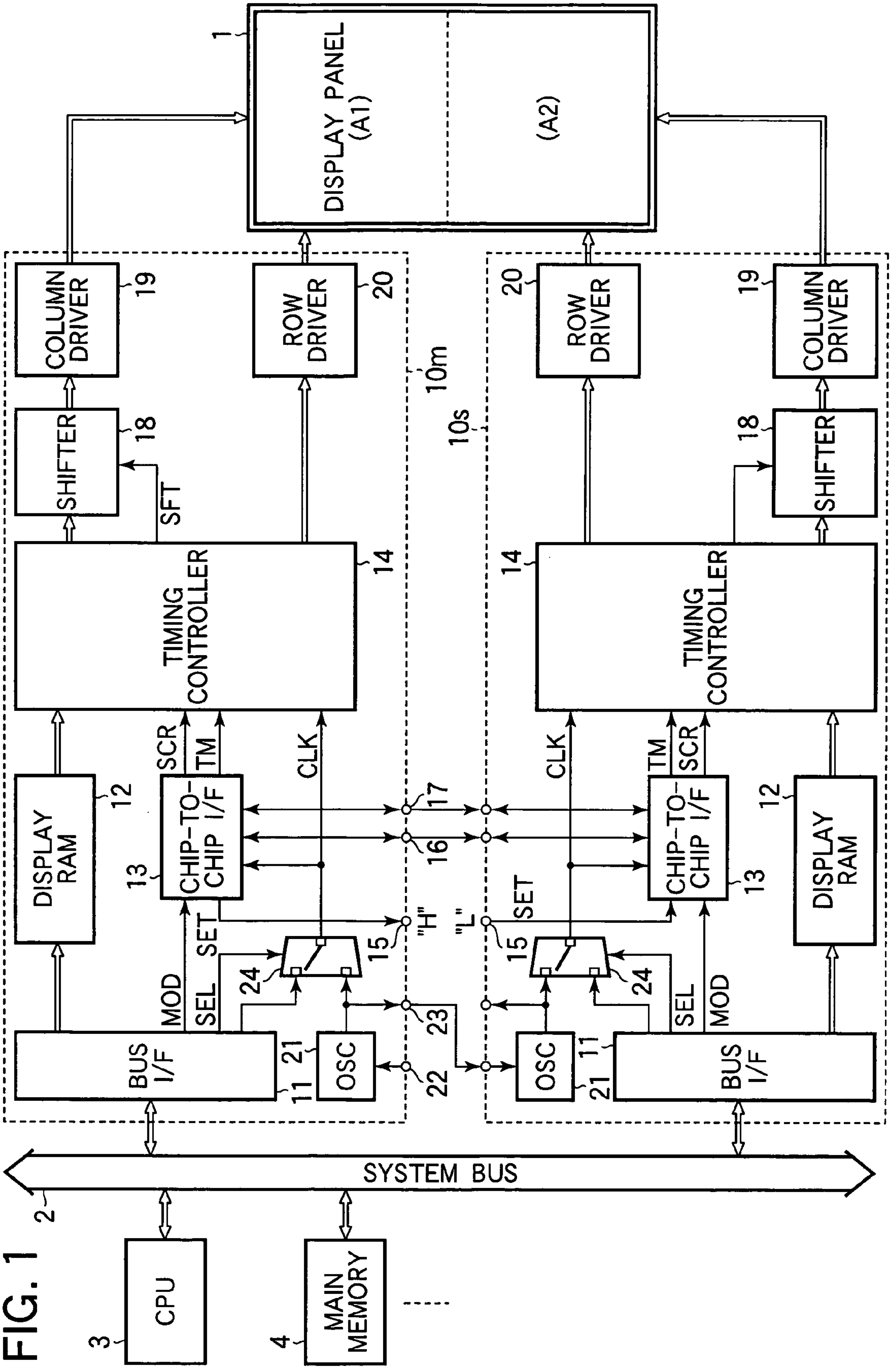
FIG. 1 is a block diagram of a display panel driver according to a first embodiment of the invention.

Embodiments of the invention will now be described with reference to the attached drawings, in which like elements are indicated by like reference characters.

First Embodiment

Referring to FIG. 1, the display panel driver in the first embodiment drives a display panel 1 that is divided vertically into two display areas. A master chip 10*m* drives the upper display area A1; a slave chip 10*s* drives the lower display area A2. The master chip 10*m* and slave chip 10*s* are connected via a system bus 2 to a central processing unit (CPU) 3 and a main memory 4.

The master chip 10*m* and slave chip 10*s* are large-scale integrated (LSI) display driver circuits having identical structures. Either chip can operate as master or slave, depending on the logic level of a setting signal SET. Therefore, the following structural description will refer to a driver chip 10*m/s* that may be either the master chip 10*m* or the slave chip 10*s*.

The driver chip 10*m/s* has a bus interface (I/F) 11 that controls input and output of signals exchanged with the CPU 3 via the system bus 2. The bus interface 11 is connected to a random-access memory (RAM), referred to below as a display RAM 12, and to a chip-to-chip interface 13, both of which are connected to a timing controller 14. The display RAM 12 stores image data supplied from the CPU 3 to be displayed on the display panel 1.

The chip-to-chip interface 13 outputs a screen saving signal SCR and a timing signal TM to the timing controller 14. The chip-to-chip interface 13 operates according to a clock signal CLK, the setting signal SET, which it receives from an external terminal 15, and a mode signal MOD, which it receives from the bus interface 11. The mode signal MOD is supplied from the CPU 3 to designate a normal mode and a screen saving mode. When the normal mode is designated, the screen saving signal SCR is held at the inactive level to disable screen saving operations. When the screen saving mode is designated, the chip-to-chip interface 13 operates differently depending on whether the setting signal SET specifies master or slave operation.

When operating as master, the chip-to-chip interface 13 sets the screen saving signal SCR to the active level to specify the screen saving mode, and sends the screen saving signal SCR to both the timing controller 14 and an external terminal 16. The chip-to-chip interface 13 also generates the timing signal TM from the clock signal CLK, and sends the signal TM to the timing controller 14 and another external terminal 17.

When operating as slave, the chip-to-chip interface 13 receives a signal from external terminal 16, outputs this signal to the timing controller 14 as the screen saving signal SCR, receives another signal from external terminal 17, and outputs this signal to the timing controller 14 as the timing signal TM.

The timing controller 14 operates according to the clock signal CLK, screen saving signal SCR, and timing signal TM. When the screen saving signal SCR designates the normal mode, for every scanning line on the display panel 1, the timing controller 14 reads image data from the display RAM 12 in synchronization with the clock signal CLK. The image data read by the timing controller 14 are supplied through a data shifter 18 to a column driver 19, which in turn drives the column lines (display electrodes) on the display panel 1. The timing controller 14 outputs a signal specifying the current row on the display panel 1 to a row driver 20, which drives the row lines (scanning electrodes) on the display panel 1. The timing controller 14 also generates a shift signal SFT and outputs it to the data shifter 18, but in the normal mode the shift signal SFT is kept inactive, so the data shifter 18 simply passes the image data received from the timing controller 14 to the column driver 19, without shifting the data.

When the screen saving signal SCR designates the screen saving mode, the timing controller 14 reads image data from the display RAM 12 row by row in synchronization with the clock signal CLK and the timing signal TM. The timing controller 14 also activates the shift signal SFT, causing the data shifter 18 to shift the image data toward the right at predetermined intervals synchronized to the timing signal TM, making the displayed image appear to scroll toward the right.

The driver chip 10*m/s* has a clock oscillator (OSC) 21 that outputs a clock signal in synchronization with an external clock signal when such is supplied from an external terminal 22, and outputs a clock signal having a predetermined frequency when no external clock signal is supplied. The clock signal from the clock oscillator 21 is supplied to an external terminal 23 and to the first input terminal of a selector 24. An external clock signal received via the bus interface 11 is supplied to the second input terminal of the selector 24. A select signal SEL, also received via the bus interface 11, is supplied to a control terminal of the selector 24.

When the upper display area A1 on the display panel 1 is driven by the master chip 10*m* and the lower display area A2 on the display panel 1 is driven by the slave chip 10*s*, the setting signal SET supplied to the external terminal 15 on the master chip 10*m* specifies master operation (e.g., is set to the high logic level, as indicated by the letter H in the drawing), and the setting signal SET supplied to the external terminal 15 on the slave chip 10*s* specifies slave operation (e.g., is set to the low logic level, as indicated by the letter L). The two external terminals 16 are interconnected, the two external terminals 17 are interconnected, and external terminal 23 on the master chip 10*m* is connected to external terminal 22 on the slave chip 10*s*.

Next, the operations in (1) the normal mode, and (2) the screen saving mode of the display panel driver in FIG. 1 will be described, on the assumption that the screen saving signal SCR is active high.

(1) Normal Mode

When the CPU sets the mode signal MOD to designate the normal mode, it also sets the select signal SEL to select the second input terminal of the selector 24, and both the master chip 10*m* and slave chip 10*s* operate on the same clock signal, received from the system bus 2. The chip-to-chip interface 13 in the master chip 10*m* drives the screen saving signal SCR to the inactive (low) level and sends this low signal to the slave chip 10*s*, disabling screen saving operations in both chips. Image data are transferred from the CPU 3 to the master chip 10*m* and the slave chip 10*s* via the system bus 2 as necessary and stored in the respective display RAMs 12. The image data are read out periodically by the timing controllers 14 and displayed on the upper display area A1 and lower display area A2 on the display panel 1.

(2) Screen Saving Mode

Before the transition to the screen saving mode, the CPU 3 transfers screen saving image data to the master chip 10*m* and the slave chip 10*s*. The screen saving image data are stored in the respective display RAMs 12 and displayed in the upper display area A1 and lower display area A2 on the display panel 1 as in the normal mode. The screen saving image may be any type of image: an image consisting of the letters A to J is shown as an example in FIG. 2.

Next, the CPU 3 sets the mode signal MOD to the level specifying the screen saving mode, and the select signal SEL to the level selecting the first input terminal of the selector 24. These signals are output by the bus interface 11 in both the master chip 10*m* and the slave chip 10*s*. The CPU 3 then enters a stand-by state and stops operating.

In the master chip 10*m*, a clock signal having a predetermined frequency is output from the clock oscillator 21 and applied to the chip-to-chip interface 13 and timing controller 14 through the selector 24. Operating in the screen saving mode as specified by the mode signal MOD, the chip-to-chip interface 13 in the master chip 10*m* drives the screen saving signal SCR to the high logic level, generates the timing signal TM from the clock signal CLK, and supplies both signals SCR and TM to the timing controller 14. The screen saving signal SCR is also supplied to external terminal 16, and the timing signal TM to external terminal 17.

Figure 2:
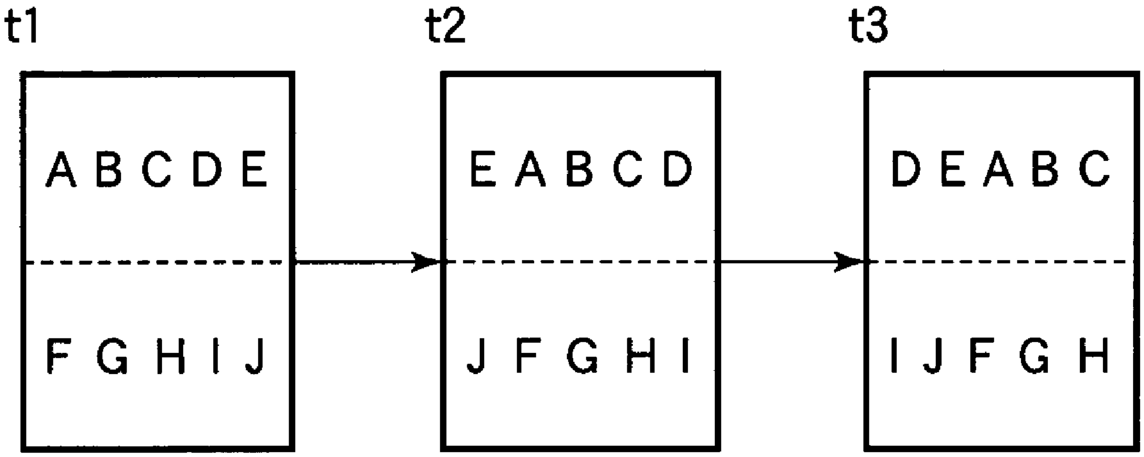
FIG. 2 shows an example of an image displayed by the first embodiment in the screen saving mode.

Since the screen saving signal SCR is high, the timing controller 14 operates according to the timing signal TM, reading image data from the display RAM 12 row by row in synchronization with this signal and the clock signal CLK. Each row of image data is stored in the data shifter 18, then supplied to the column driver 19, starting at a specified point in the row and wrapping around from one end of the row to the other. Periodically, the timing controller 14 uses the shift signal SFT to shift the starting point so that the image appears to scroll cyclically to the right. In FIG. 2, for example, the letter A is displayed at the left edge of the upper display area A1 at time t1, is shifted to the next position to the right at time t2, and is shifted another position to the right at time t3, while the letter E is displayed at right edge of the upper display area A1 at time t1, is shifted to the left edge at time t2, and is then shifted to the right at time t3.

In the slave chip 10*s*, the clock oscillator 21 operates according to the clock signal CLK output from the external terminal 23 of the master chip 10*m*. The clock signal output from the clock oscillator 21 is applied to the chip-to-chip interface 13 and the timing controller 14 via the selector 24. The chip-to-chip interface 13, which operates in the screen saving mode as specified by the mode signal MOD, receives the screen saving signal SCR and timing signal TM output from the master chip 10*m* via external terminals 16 and 17, the screen saving signal SCR being at the high logic level, and supplies both signals SCR and TM to the timing controller 14.

Since the screen saving signal SCR is high, the timing controller 14 operates according to the timing signal TM, reading image data from the display RAM 12 row by row in synchronization this signal and the clock signal CLK. Each row of image data is stored in the data shifter 18, which shifts the stored data cyclically to the right according to the shift signal SFT received from the timing controller 14 as described above. For example, the letter F displayed at the left edge of the lower display area A2 at time t1 in FIG. 2 is shifted successively to the right at times t2 and t3, while the letter H displayed at the right edge of the lower display area A1 at time t2 is shifted to the left edge at time t2, then to the next position to the right at time t3.

The operations carried out in the master chip 10*m* in the screen saving mode are controlled by the screen saving signal SCR, the timing signal TM, and the clock signal CLK supplied to the timing controller 14. All three of these signals are also transferred to the chip-to-chip interface 13 and used to control the timing controller 14 in the slave chip 10*s*. The master chip 10*m* and slave chip 10*s* therefore operate with same timing and display a coordinated screen saving image on the upper display area A1 and lower display area A2 on the display panel 1.

Various modifications can be made to the first embodiment. For example:

(a) Instead of having two identical driver chips 10 operate as master and slave according to a setting signal SET, the functions of the chip-to-chip interface 13 can be modified to have one driver chip operate as a dedicated master chip and the other driver chip operate as a dedicated slave chip.

(b) Instead of using a data shifter 18 to scroll the screen horizontally, the timing controller 14 can manipulate the read address in the display RAM 12 to achieve the same effect. The data shifter 18 can then be omitted.

(c) The screen saving image can be scrolled to the right instead of to the left.

(d) The display area of the display panel 1 can be divided horizontally instead of vertically. If the screen is divided horizontally, the screen saving image is scrolled vertically.

Second Embodiment

Figure 3:
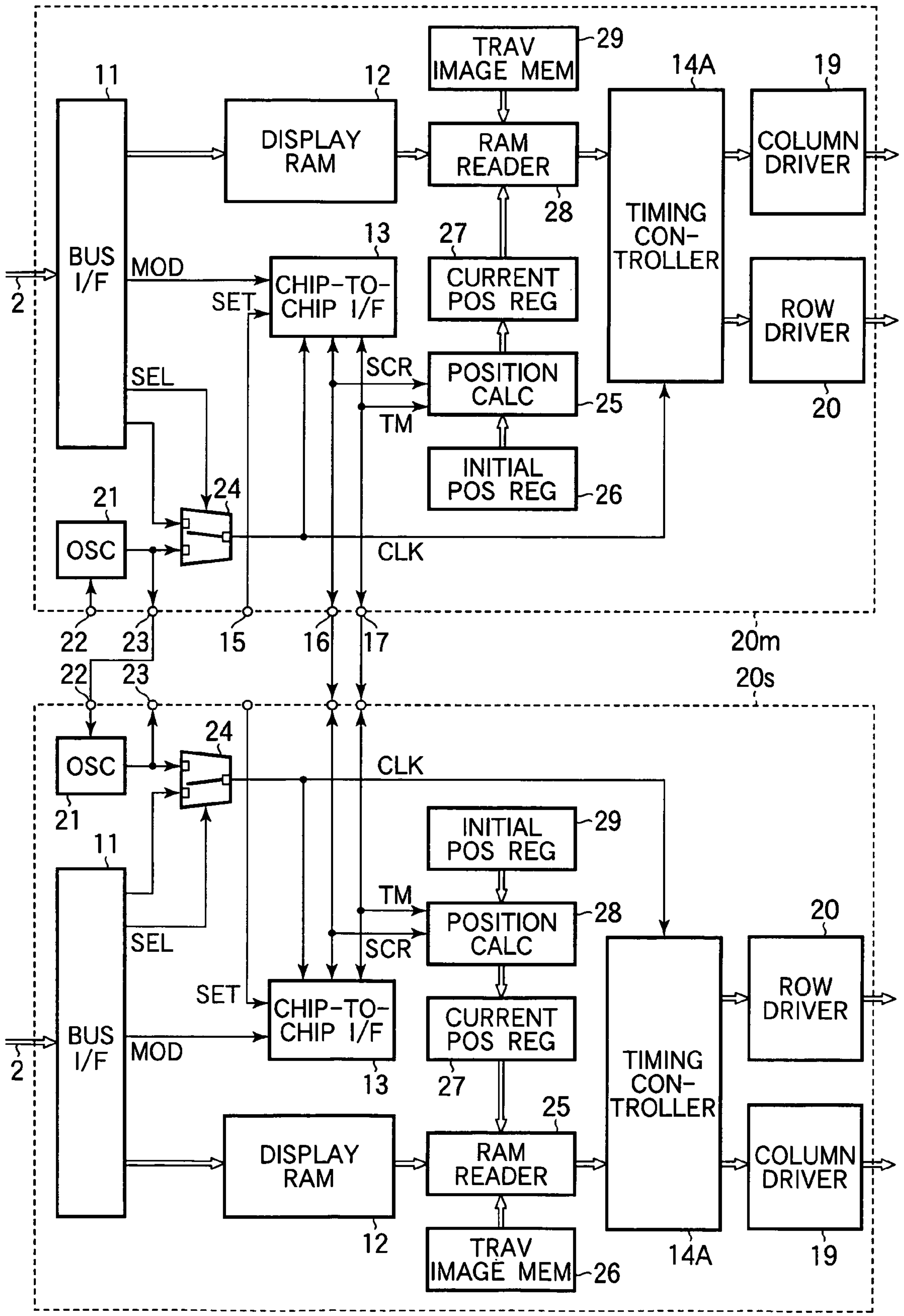
FIG. 3 is a block diagram of a display panel driver according to a second embodiment of the invention.

FIG. 3 shows the structure of a display panel driver in a second embodiment of the invention. This display panel driver displays a small screen saving image X that travels freely in both the horizontal and vertical directions across the entire screen area of the display panel 1, even though the screen is divided into two halves. The driver has a master chip 20*m* for driving the upper half A1, and a slave chip 20*s* for driving the lower half A2. The master chip 20*m* and the slave chip 20*s* are connected to the CPU 3 and the main memory 4 via the system bus 2 as in the first embodiment. The master chip 20*m* and the slave chip 20*s* are identical display driver LSI chips, either one of which can operate as master or slave as specified by the setting signal SET. In the following description of the structure of the master and slave chips, both chips will also be referred to as a driver chip 20*m/s*.

The driver chip 20*m/s* employs a virtual spatial coordinate system that covers both the upper display area A1 and lower display area A2 of the display panel 1. Each driver chip 20*m/s* has a display RAM 12 for one half of the virtual coordinate space. The display RAM 12 of the master chip 20*m* stores image data for the upper half of the virtual spatial coordinate system; the display RAM 12 of the slave chip 20*s* stores image data for the lower half of the virtual spatial coordinate system.

The driver chip 20*m/s* has a position calculator (CALC) 25 for calculating the current coordinates of the traveling image X according to a predetermined rule, formula, or algorithm, starting from coordinate values stored in an initial position register (POS REG) 26, indicating the location of the image X at the beginning of the screen saving operation. The calculation is triggered by the timing signal TM when the screen saving signal SCR is active, the screen saving signal SCR and timing signal TM being supplied from the chip-to-chip interface 13. The position calculator 25 stores the resultant coordinate values of the current position of the image X into a current position register 27.

The coordinate values stored in the current position register 27 are read by a RAM reader 28. The RAM reader 28 determines whether, in its current position, any part of the traveling image X overlaps the chip's display area. If so, the RAM reader 28 replaces the overlapping part of the image data read from the display RAM 12 with image data for the traveling image X, which are stored in a traveling image memory (TRAV IMAGE MEM) 29, before supplying the image data to the timing controller 14A. If there is no overlap, the image data read from the display RAM 12 are supplied to the timing controller 14A without replacement.

The image data supplied to the timing controller 14A are output to the column driver 19 and row driver 20 in synchronization with the clock signal CLK and displayed on the display panel 1. The data shifter intervening between the timing controller and column driver in the first embodiment is not needed in the second embodiment.

The other parts 11-13, 15-17, 21-24 of the driver chip 20*m/s* are as described in the first embodiment.

Figure 4:
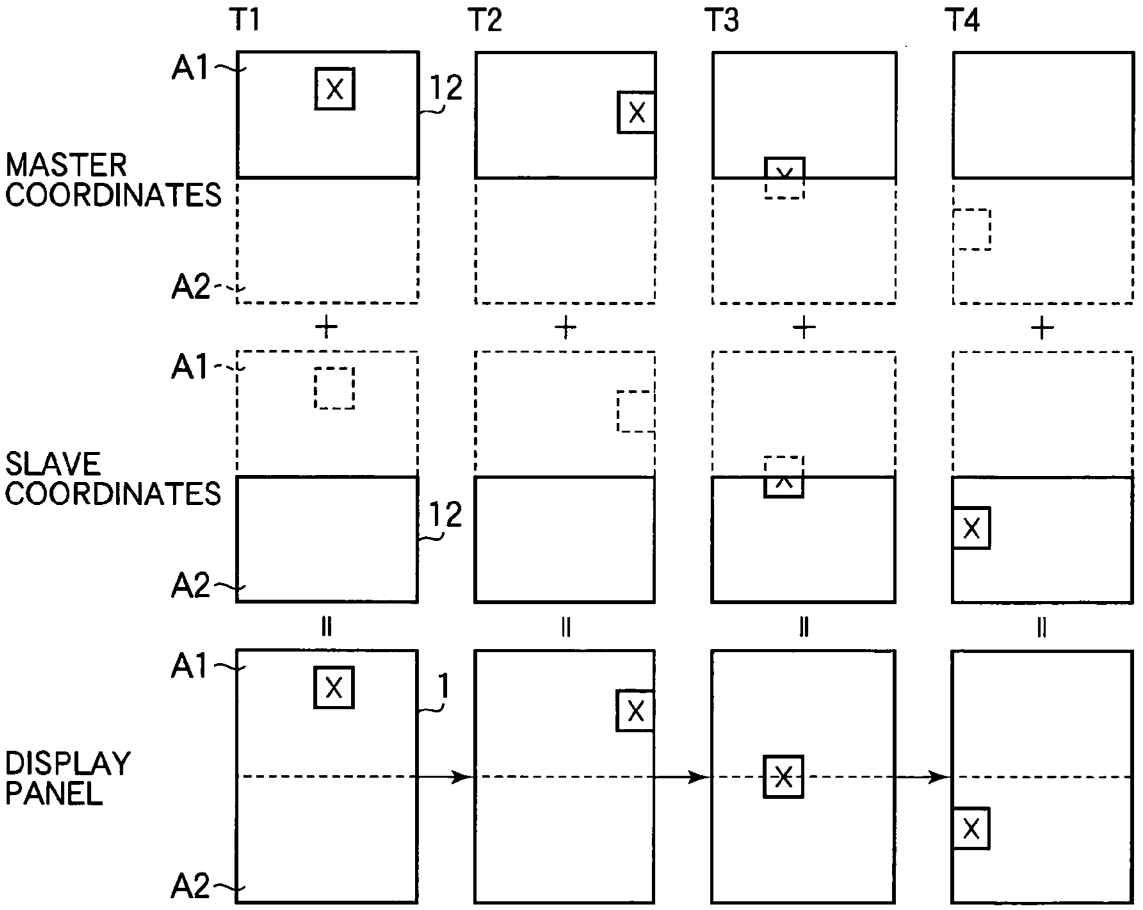
FIG. 4 shows an example of an image displayed by the second embodiment in the screen saving mode.

FIG. 4 shows an example of a screen saving image generated in the second embodiment. The operation of the display panel driver in FIG. 3 will now be described with reference to FIG. 4.

Before the transition to the screen saving mode, the CPU 3 transfers stationary screen saving image data to the master chip 20*m* and the slave chip 20*s*, and these data are stored in the respective display RAMs 12. The CPU 3 also transfers image data for the traveling image X; these image data are stored in the traveling image memory 29 via a data path not explicitly shown in FIG. 3. The stationary screen saving image data may specify a blank image, or any other desired image. Alternatively, the contents of the display RAM 12 may be cleared by driver hardware at the beginning of the screen saving mode, and the traveling image data may be permanently stored in the traveling image memory 29, so that no screen saving image data have to be transferred from the CPU 3.

Next, the CPU 3 sets the mode signal MOD and select signal SEL to specify the screen saving mode and select the first input terminal of the selector 24. These signals are output by the bus interfaces 11 in the master chip 10*m* and slave chip 10*s*, after which the CPU 3 stops operating and enters the stand-by mode.

The clock oscillator 21 and chip-to-chip interface 13 in the master chip 20*m* operate as described in the first embodiment, generating a clock signal that is supplied through the selector 24 to the timing controller 14A, and a screen saving signal SCR and timing signal TM that are supplied to the position calculator 25. The clock oscillator 21 and chip-to-chip interface 13 in the slave chip 20*s* receive these signals SCR and TM from the master chip 20*m*, and supply identical signals to the timing controller 14A and position calculator 25 in the slave chip 20*s*.

In both chips 20*m*, 20*s*, the position calculator 25 repeatedly calculates the current position of the traveling image X, in synchronization with the timing signal TM, and stores the resultant coordinate values of the current position in the current position register 27. From the coordinate values stored in the current position register 27, the RAM reader 28 determines whether any part of the traveling image X overlaps the half of the display panel 1 for which image data are stored in the display RAM 12.

When the traveling image X in its current location does not overlap the image stored in the display RAM 12, the RAM reader 28 reads the image data stored in the display RAM 12 and supplies the image data to the timing controller 14A. If there is any overlap, before passing the image data read from the display RAM 12 to the timing controller 14A, the RAM reader 28 replaces the overlapping part of the image data with the corresponding part of the image data of the traveling image X stored in the traveling image memory 29.

For example, at time T1 in FIG. 4, the traveling image X is in an initial position disposed entirely in the upper display area A1 driven by the master chip 20*m*. The traveling image X overlaps part of the image stored in the display RAM 12 in the master chip 20*m*, but does not overlap any part of the image data stored in the display RAM 12 in the slave chip 20*s*.

The image data in the display RAM 12 are read out by the RAM reader 28 in the master chip 20*m* and slave chip 20*s*, and displayed in upper area A1 and lower area A2 of the display panel 1, respectively. In the upper display area A1, however, the image data are partly replaced by the data of the traveling image X read from the traveling image memory 29. The display panel 1 thus displays the traveling image X at its initial position.

The position of the traveling image X changes over time. At time T2, the traveling image X has moved to a different location in the upper display area A1, and replaces a different part of the image data read from the display RAM 12 in the master chip 20*m*.

At time T3, the traveling image X is crossing the boundary between the upper display area A1 and lower display area A2, so part of the traveling image X replaces part of the image data read from the display RAM 12 in the master chip 20*m*, and another part of the traveling image X replaces part of the image data read from the display RAM 12 in the slave chip 20*s*. In this case, the master chip 20*m* displays the upper half of the traveling image X in the upper half A1 of the display panel 1, and the slave chip 20*s* displays the lower half of the traveling image X in the lower half lower display area A2 of the display panel 1.

At time T4, the traveling image X has moved completely into the lower display area A2, and is displayed by the slave chip 20*s*.

As in the first embodiment, the operations performed in the master chip 20*m* in the screen saving mode are controlled by the screen saving signal SCR, timing signal TM, and clock signal CLK, and these three signals are also transferred to and used in the slave chip 20*s*. The master chip 20*m* and slave chip 20*s* therefore operate with the same timing, calculate the same position for the traveling image X in the virtual coordinate system, and display a coordinated screen saving image that travels across both halves A1 and A2 of the display panel 1. This is moreover accomplished without the need to transfer position coordinate data between the master chip 20*m* and slave chip 20*s*.

Various modifications can be made to the second embodiment. For example:

(a) The position calculator 25, initial position register 26, current position register 27, and RAM reader 28 can be replaced with any other set of components performing a similar function.

(b) Instead of having two identical driver chips 20 operate as master and slave according to a setting signal SET, the function of the chip-to-chip interface 13 can be modified to have one driver chip operate as a dedicated master chip and the other driver chip operate as a dedicated slave chip.

Those skilled in the art will recognize that further variations are possible within the scope of the invention, which is defined in the appended claims.

What is claimed is:

1. A display panel driver for displaying an image on a display panel divided into a first display area and a second display area abutting the first display area, the display panel driver comprising:

a first driver circuit; and a second driver circuit; wherein each of the first driver circuit and the second driver circuit has respective facilities for receiving, storing, and displaying image data, generating and displaying a screen saving image, and generating a timing signal that causes the screen saving image to move;

each of the first driver circuit and the second driver circuit has a normal mode and a screen saving mode, and is operable as master and slave in the screen saving mode;

the first driver circuit and the second driver circuit are disposed in separate integrated circuit chips that are connected in parallel between a system bus and the display panel, each integrated circuit chip having an external master/slave terminal that receives a voltage having a first logic level if the respective driver circuit is to operate as the master in the screen saving mode or having a second logic level if the respective driver circuit is to operate as the slave in the screen saving mode;

the second driver circuit is identical in structure to the first driver circuit;

the first driver circuit has a first oscillator and a first external terminal that is directly connected to the first oscillator;

the second driver circuit has a second oscillator and a second external terminal that is directly connected to the second oscillator, the first and second external terminals being directly connected to one another; and in the normal mode, the first driver circuit receives first image data from the bus, and stores and displays the first image data in the first display area, and the second driver circuit receives second image data from the bus, and stores and displays the second image data in the second display area; and in the screen saving mode, the first driver circuit generates, as said screen saving image, a first screen saving image that moves in synchronization with a clock signal generated by one of the first and second oscillators and displays the first screen saving image in the first display area, and the second driver circuit generates, as said screen saving image, a second screen saving image that moves in synchronization with the clock signal generated by said one of the first and second oscillators and displays the second screen saving image in the second display area, the second screen saving image moving in the second display area in coordination with the movement of the first screen saving image in the first display area so as to depict a coordinated screen saver that is displayed on the first and second display areas.

2. A display panel driver of claim 1, wherein:

the first driver circuit comprises a first memory unit for storing the first image data, a first driving unit for reading the first image data from the first memory unit, displaying the first image data in the normal mode, shifting the first image data in synchronization with the clock signal generated by said one of the first and second oscillators in the screen saving mode to generate the first screen saving image, and displaying the first screen saving image in the screen saving mode, a first bus interface unit that is connected to the bus, and a first interface unit for receiving a mode signal from the bus via the first bus interface unit, the mode signal specifying either the normal mode or the screen saving mode, and the second driver circuit comprises a second memory unit for storing the second image data, a second driving unit for reading the second image data from the second memory unit, displaying the second image data in the normal mode, shifting the second image data in synchronization with the clock signal generated by said one of the first and second oscillators to generate the second screen saving image, and displaying the second screen saving image in the screen saving mode, a second bus interface unit that is connected to the bus, and a second interface unit for receiving the mode signal from the bus via the second bus interface unit.

3. The display panel driver of claim 1, wherein the first display area and the second display area are disposed one above another, and the first screen saving image and the second screen saving image are scrolled horizontally.

4. The display panel driver of claim 3, wherein the first screen saving image and the second screen saving image wrap around from one vertical edge of the display panel to another vertical edge of the display panel.

5. The display panel driver of claim 1, wherein the first display area and the second display area are disposed side by side, and the first screen saving image and the second screen saving image are scrolled vertically.

6. The display panel driver of claim 5, wherein the first screen saving image and the second screen saving image wrap around from one horizontal edge of the display panel to another horizontal edge of the display panel.

7. The display panel driver of claim 1, wherein:

the first driver circuit comprises a first memory unit for storing the first image data, a first screen saving unit for generating traveling image data displayable in a traveling region of the display panel, selecting an initial position of the traveling region, changing the position of the traveling region on the display panel in synchronization with the timing signal, and generating first position information indicating a current location of the traveling region, a first data reading unit for reading the first image data from the first memory unit, outputting the first image data in the normal mode, and outputting the first image data and the traveling image data in the screen saving mode, the traveling image data being output in the screen saving mode for any part of the first display area indicated by the first position information to overlap the traveling region in its current location, the first image data being output in the screen saving mode for any part of the first display area not overlapping the traveling region in its current location, a first driving unit for displaying the image data output by the first data reading unit in the first display area, a first bus interface unit that is connected to the bus, and a first interface unit for receiving a mode signal from the bus via the first interface unit, the mode signal specifying either the normal mode of the screen saving mode, and the second driver circuit comprises a second memory unit for storing the second image data, a second screen saving unit for generating traveling image data and position information identical to the traveling image data and position information generated by the first screen saving unit in the first driver circuit, a second data reading unit for reading the second image data from the second memory unit, outputting the second image data in the normal mode, and outputting the second image data and the traveling image data in the screen saving mode, the traveling image data being output in the screen saving mode for any part of the second display area indicated by the second position information to overlap the traveling region in its current location, the second image data being output in the screen saving mode for any part of the second display area not overlapping the traveling region in its current location;

a second driving unit for displaying the image data output by the second data reading unit in the second display area, a second bus interface unit that is connected to the bus, and a second interface unit for receiving the mode signal from the bus via the second interface unit.

8. The display panel driver of claim 7, wherein the position information comprises coordinates in a virtual spatial coordinate system covering both the first display area and the second display area.

9. The display panel driver of claim 7, wherein the first screen saving unit and the second screen saving unit each separately comprise:

a traveling image memory for storing the traveling image data;

an initial position register storing the initial position of the traveling region;

a position calculator for calculating a new position of the traveling region from the current position of the traveling region; and a current position register for storing the position calculated by the position calculator.

10. A display panel driver of claim 1, wherein the first and second driver circuits receive a clock signal from the bus during the normal mode but not the screen saving mode.

11. A display panel driver of claim 1, wherein the first driver circuit further comprises a first bus interface that is connected to the bus and a first selector having first and second input terminals, the first input terminal of the first selector receiving a clock signal from the system bus via the first bus interface during the normal mode and the second input terminal receiving an output signal from the first oscillator during the screen saving mode, and wherein the second driver circuit further comprises a second bus interface that is connected to the system bus and a second selector having first and second input terminals, the first input terminal of the second selector receiving the clock signal from the system bus via the second bus interface during the normal mode and an output signal from the second oscillator during the screen saving mode.

* * * * *